Jan. 31, 1967  G. A. REESE  3,301,091

MAGNETIC GEARING ARRANGEMENT

Filed July 5, 1963  6 Sheets-Sheet 1

INVENTOR:
Glenn A. Reese

By Smyth, Roston & Pavitt
Attorneys

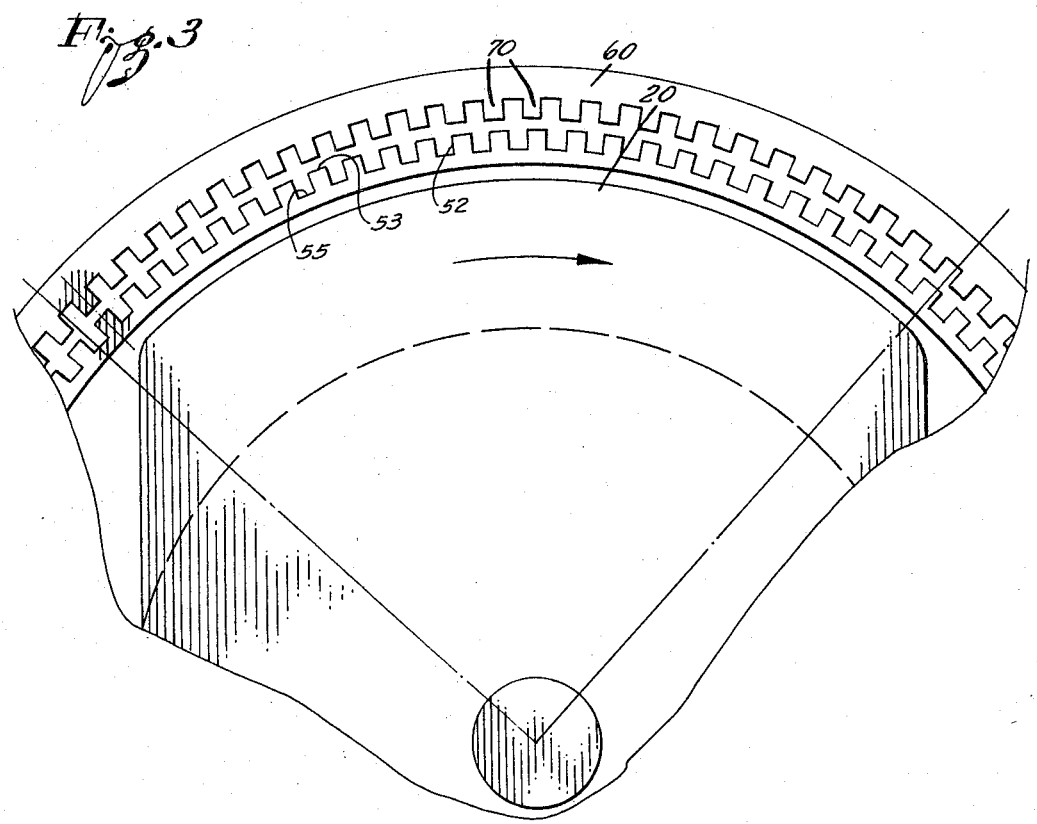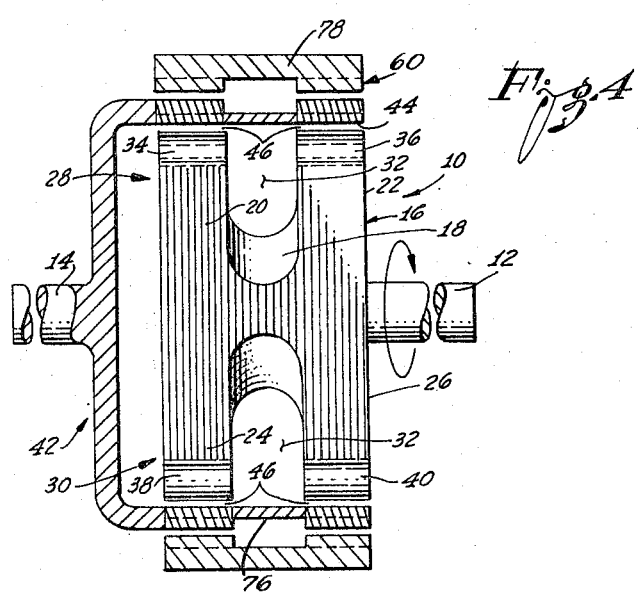

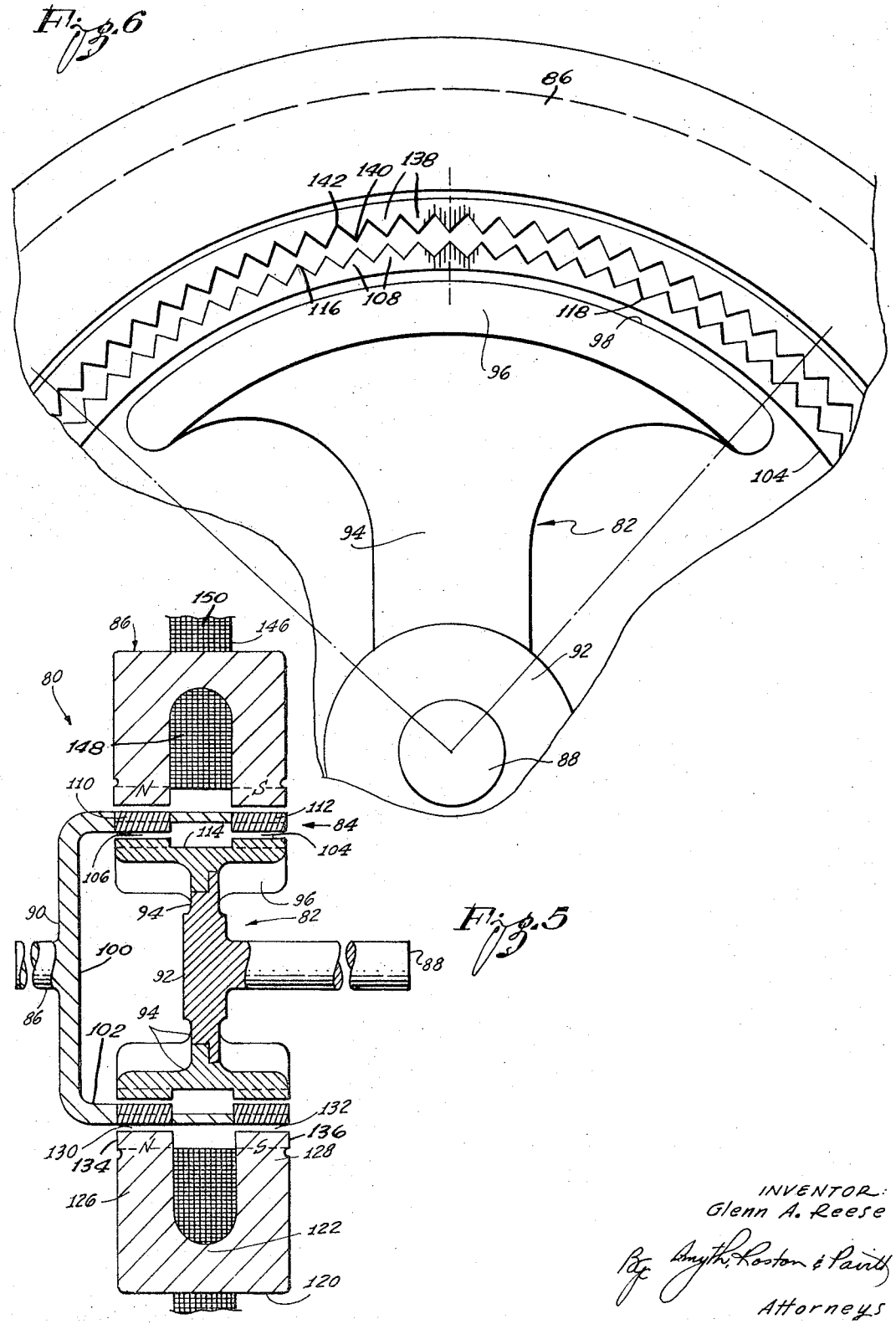

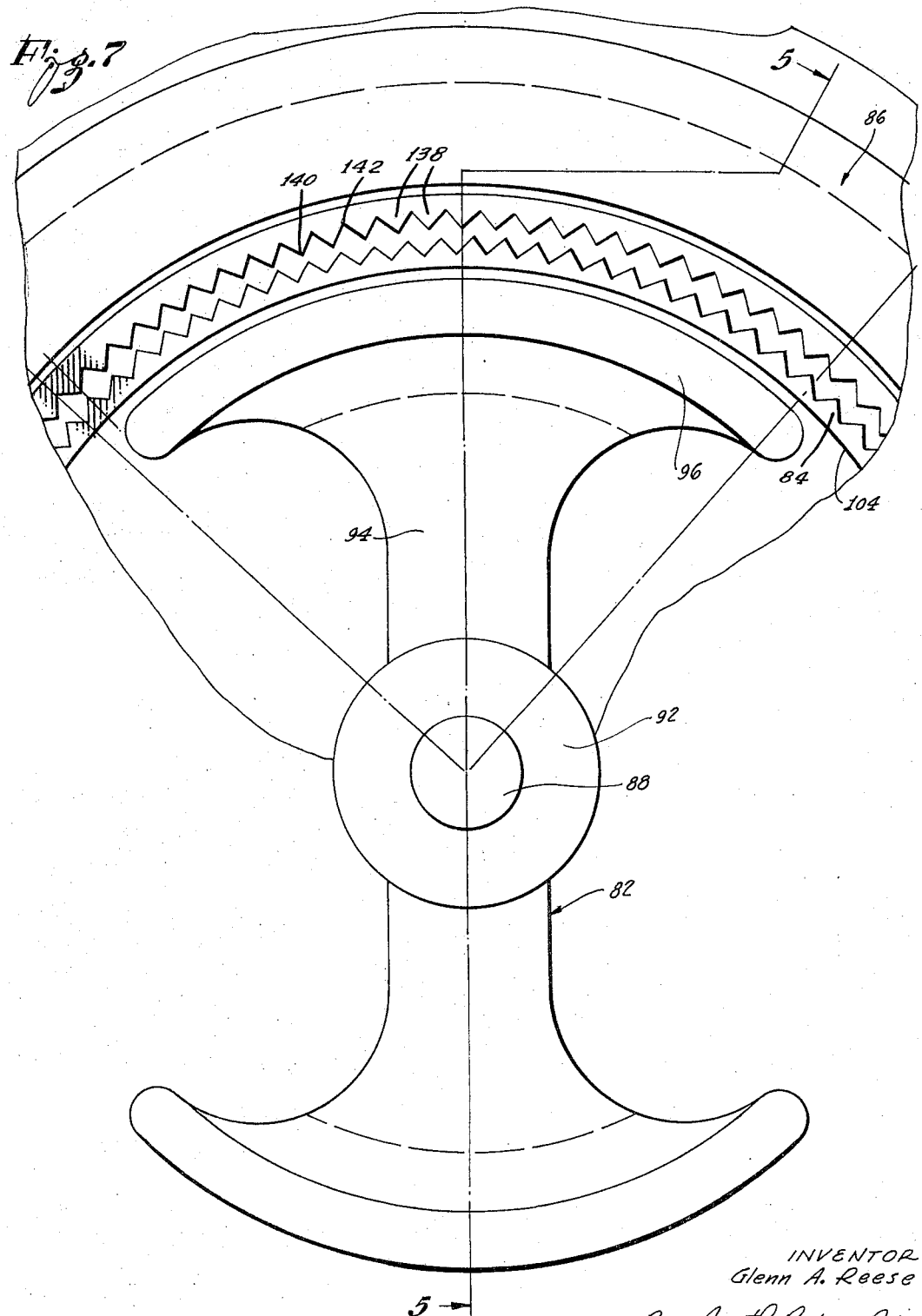

Jan. 31, 1967  G. A. REESE  3,301,091
MAGNETIC GEARING ARRANGEMENT
Filed July 5, 1963  6 Sheets-Sheet 5
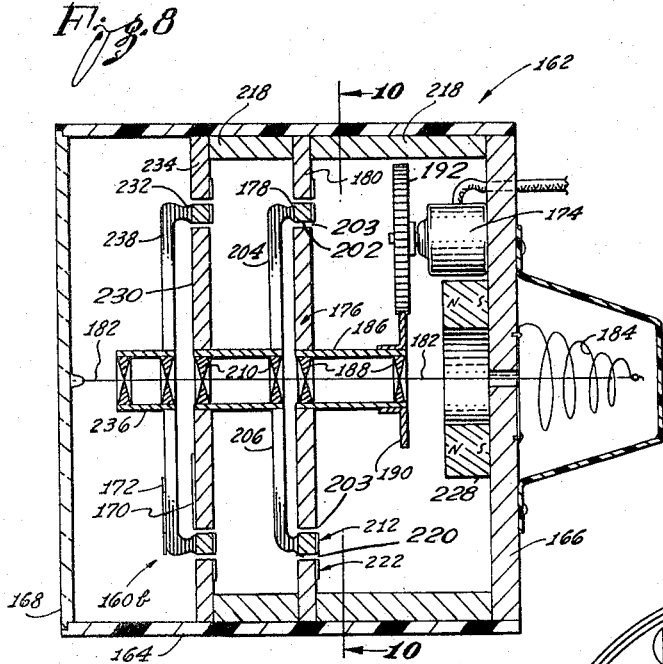
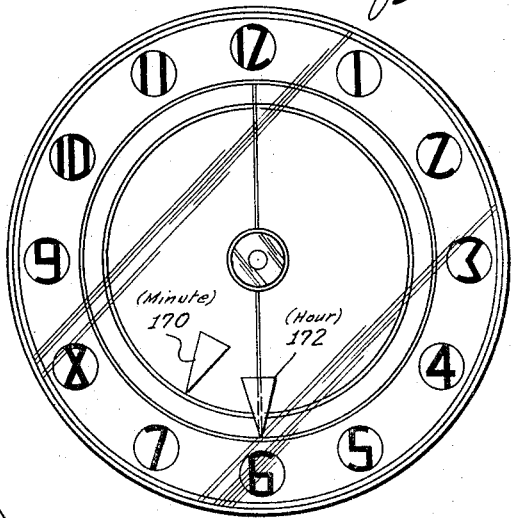
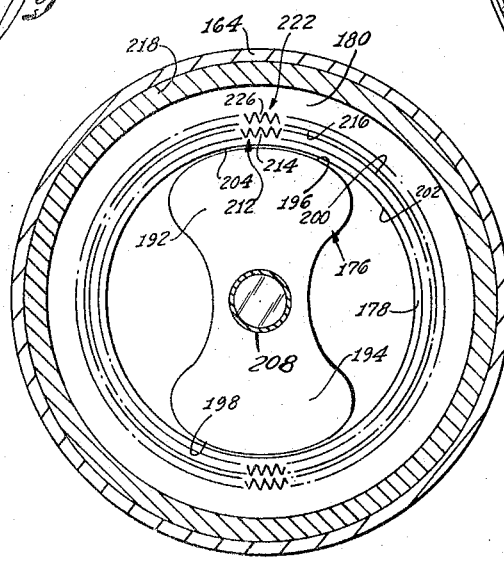
INVENTOR
Glenn A. Reese
Attorneys Jan. 31, 1967    G. A. REESE    3,301,091
MAGNETIC GEARING ARRANGEMENT
Filed July 5, 1963    6 Sheets-Sheet 6

INVENTOR:
Glenn A. Reese

Attorneys

United States Patent Office 3,301,091
Patented Jan. 31, 1967

3,301,091
MAGNETIC GEARING ARRANGEMENT
Glenn A. Reese, San Pedro, Calif., assignor to The Magnavox Company, Torrance, Calif., a corporation of Delaware
Filed July 5, 1963, Ser. No. 294,216
9 Claims. (Cl. 74—640)

The present invention relates to gear means and, more particularly, to a new and improved type of gear means. This is a continuation-in-part of copending application Serial No. 266,341, now abandoned, filed March 19, 1963, by Glenn A. Reese for Magnetic Gearing Arrangement.

At the present time, there are a large number of gear means effective to increase or decrease speed while decreasing or increasing torque. Although such means have been effective to produce speed changes, they all have various objections and/or limitations. For example, all of the foregoing gear means employ gears having teeth that physically engage each other in some form of sliding or rolling contact. This makes it necessary for all of the teeth to be carefully machined to insure a precise mating. However, the mating of the various teeth in even the most expensive and precisely machined gears produces substantial amounts of noise and vibrations in the driving and driven members. In addition, the gears are subject to wearing and require frequent servicing such as lubrication.

It has also been found very difficult, if not impossible, in previous gear trains, to disengage the gears, particularly when they are heavily loaded. Furthermore, because the teeth on the gears must be in direct contact, if a severe overload or stalling of the driven member occurs, the entire system including the gear train, load and/or motor will be correspondingly over-loaded and/or stalled. This may result in one or more portions of the system being irrepairably damaged and/or the motor burning up. When it is desired to provide extremely high gear ratios, it has been necessary to resort to a large number of gears or employ a gear system such as a worm and worm wheel. The use of such gears not only magnifies the foregoing difficulties, but also frequently imposes objectionable spacial relationships, such as the use of right angle drives, etc.

It is now proposed to provide gear means which will overcome the foregoing difficulties. More particularly, it is proposed to provide gear means which will not only be inexpensive to manufacture and reliable and trouble-free in operation, but will also insure a silent and vibration-free drive train that may be arranged in any desired spacial configuration including coaxial or in line even while providing extremely high gear ratios. It is also proposed to provide gear means that may not only be readily clutched and declutched even when under heavy load, but will also transmit power up to a predetermined maximum torque. If this maximum torque is exceeded, a slipping action will occur that will relieve the system from a damaging overload. This is to be accomplished by providing one or more members that are disposed in a spaced, non-meshing relation but are drivingly coupled to each other. Since all forms of mechanical contact between the driving and driven members has been eliminated, the necessity for precision machining and the resultant cost thereof have also been eliminated as well as wearing and noise.

These and other features and advantages of the present invention will become readily apparent from the following detailed description of one embodiment thereof, particularly when taken in connection with the accompanying drawings wherein like reference numerals refer to like parts, and wherein:

FIGURE 3 is a transverse, cross-sectional view similar to FIGURE 2 but showing the gear means during different operating conditions;

FIGURE 4 is a cross-sectional view of the gear means of FIGURE 1;

FIGURE 5 is a cross-sectional view similar to FIGURE 4 but showing gear means employing a different embodiment of the present invention;

FIGURE 6 is a fragmentary cross-sectional view similar to FIGURE 2 showing the gear means of FIGURE 5 in one operating condition;

FIGURE 7 is similar to FIGURE 3 but showing the modified gear means of FIGURE 5 in a different operating condition;

FIGURE 8 is a longitudinal cross-sectional view of a clock employing gear means embodying another form of the present invention;

FIGURE 9 is an end view of the clock of FIGURE 8;

FIGURE 10 is a cross-sectional view of the clock taken substantially along the plane of line 10—10 in FIGURE 8.

Figure 1:
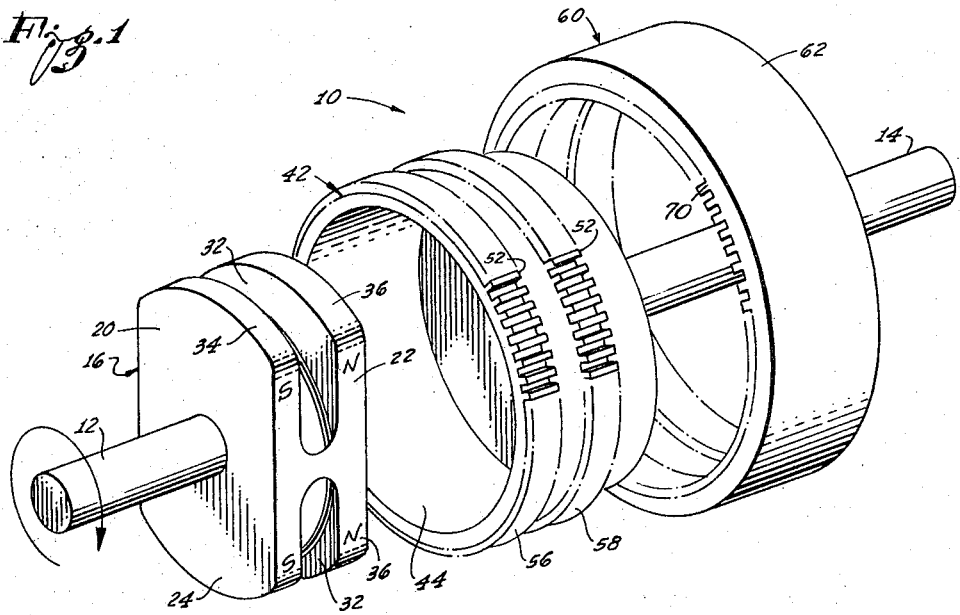
FIGURE 1 is an exploded perspective view of gear means embodying one form of the present invention.

Referring to the drawings in more detail, and particularly to FIGURES 1-4, inclusive, the present invention is particularly adapted to be embodied in a gear means 10 having a high speed shaft 12 and a low speed shaft 14. The gear means 10 may be interconnected between a suitable driving means such as an electric motor (not shown) and a suitable load (not shown) that is to be driven thereby. When the load is to be driven at a low speed by a high speed motor, the gear means 10 may act as a speed reducing drive. In this mode of operation, the high speed shaft 12 will be the input shaft and it may be operatively interconnected directed with the output shaft of the high speed motor. The slow speed shaft 14 will then be the output shaft and it may be interconnected with the load for driving the load at a relatively low speed. Conversely, in the event the load is to be driven at a high speed, the low speed shaft 14 may comprise the input shaft and the high speed shaft 12 may then form the output shaft.

The inner end of the high speed shaft 12 has a high speed rotor 16 secured directly thereto. The rotor 16 is keyed or otherwise secured to the shaft 12 so as to always rotate therewith. The rotor 16 may be of any desired configuration. However, in the present instance, it includes a central hub 18 that is substantially concentric with the shaft 12. A plurality of arms 20, 22, 24 and 26 may be provided on the hub 18 so as to extend radially outwardly therefrom. In the present instance, there are two sets 28 and 30 of arms that are disposed on diametrically opposite sides of the hub 18. The arms 20, 22, 24 and 26 are all substantially identical to each other and have a substantially rectangular cross-sectional cross-section. The arms in each set 28 and 30 are separated from each other by an air space 32. The outer end of each arm terminates in a substantially cylindrical surface or face 34, 36, 38 and 40. Each of these surfaces are substantially concentric with the axis of rotation so that the surfaces will sweep out a cylindrical surface. Each face subtends a limited arc such as 90° whereby at any given time, the surface swept by the faces will be substantially equally divided between the surfaces of faces 34, 36, 38 and 40 and the air spaces therebetween.

The inner end of the low speed shaft 14 has a low speed rotor 42 secured directly thereto. This rotor 42 may be positively secured to the shaft 14 by any suitable means so that the rotor 42 will always rotate therewith. The interior of the low speed rotor 42 has a substantially cylindrical inner surface 44. As may be seen in FIGURE 4, the rotor 42 may fit over the high speed rotor 16 so that the rotor 16 may be disposed inside of the rotor 42. The inside diameter of the surface 44 of the low speed rotor 42 is preferably only slightly greater than the outside diameter of the volume swept by the faces 34, 36, 38 and 40 on the outer ends of the arms 20 to 26. As a consequence, a small air gap 46 will be present between the faces 20 to 26, inclusive, and the surface 44. As will become apparent, it is desirable that this air space 46 be only large enough to permit free running between the pole faces 20 to 26, inclusive, and the low speed rotor 42.

The exterior of the low speed rotor 42 may be generally cylindrical and substantially concentric with the low speed shaft 14. This outer surface may include one or more sets 56 and 58 of what will be referred to herein as teeth 52. As will be explained subsequently, the term or expression teeth as used herein does not mean teeth in the conventional sense that they are projections that must physically mesh with or contact another projection. Instead, the present teeth form a part of a magnetic circuit and, as a consequence, that term as used in this specification and the claims appended thereto may have any desired configuration and may or may not project from the surface of the rotor. The teeth merely include a segment of a magnetically permeable material having a low reluctance such as a soft iron.

Figure 2:
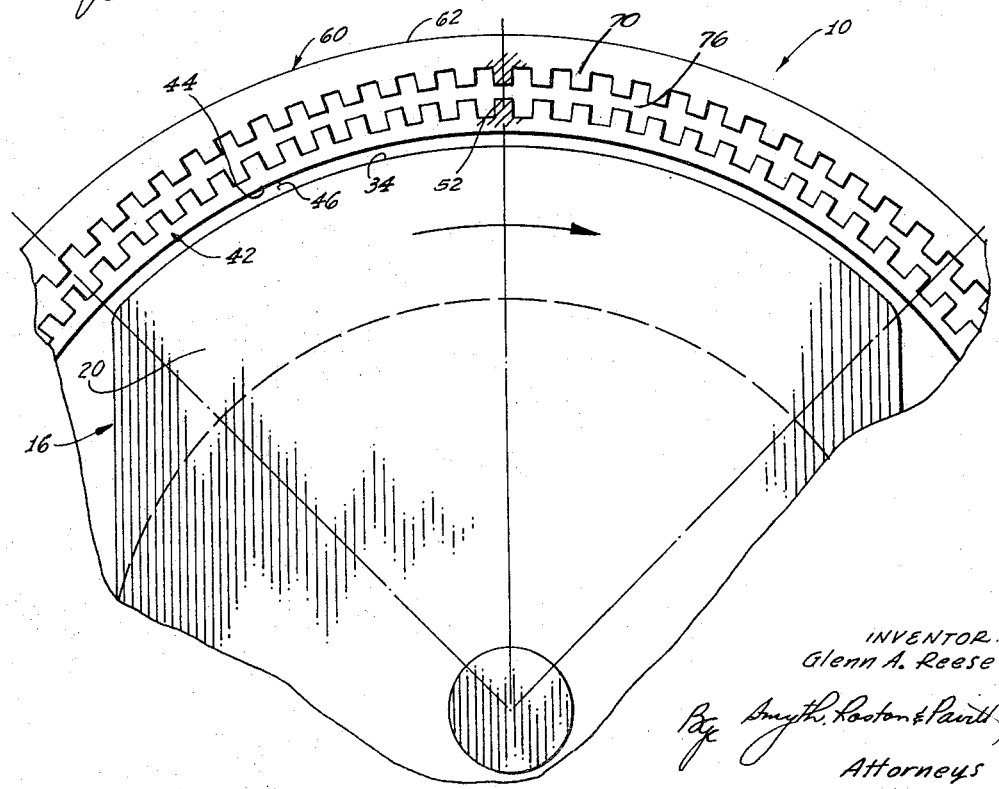
FIGURE 2 is a cross-sectional view, on a greatly enlarged scale of a portion of the gear means of FIGURE 1 in one operating condition.

The teeth may be buried inside of the rotor 42 or they may project therefrom substantially as shown in FIGURES 2 and 3. In this embodiment, the teeth 52 have rectangular shapes with flat faces 53 and square roots 55. The teeth 52 are arranged to form a separate set 56 and 58 for each of the faces in the sets 28 and 30 of the arms on the rotor 16. The set 56 is positioned so as to be substantially radially aligned with the faces 34 and 38 while the set 58 is disposed so as to be substantially radially aligned with the faces 36 and 40.

A stator 60 may be provided that surrounds and encloses the high speed and low speed rotors 16 and 42. The exterior of the stator 60 may form a generally cylindrical surface 62 that is substantially concentric with the two shafts 12 and 14. This surface may be of any desired configuration that is convenient for anchoring the stator 60 to a fixed structure. This connection or anchoring should be of sufficient strength to insure the stator 60 acting as a reaction member.

The stator 60 may also include an inner surface 64 that is substantially concentric with the axes of rotation of the rotors 16 and 42. This inner surface 64 may include separate sets 66 and 68 of teeth 70. These sets 66 and 68 are positioned to register with the sets 56 and 58 of teeth 52 on the exterior of the low speed rotor 42. The teeth 70 in these sets 66 and 68 do not mechanically or physically contact or mesh with any other members or teeth. Instead, they are intended to be magnetically coupled to the teeth 52 in the sets 56 and 58. As a consequence, these teeth may be of any desired configuration. However, in the present instance, they are similar to the teeth 52 in the first sets 56 and 58 and have faces 72 and roots 74. The sets 66 and 68 are arranged to be in substantially radial alignment with the sets 56 and 58. When one tooth 52 in the sets 54 and 56 are exactly aligned with a tooth 70 in the sets 66 and 68, the mating ends or faces of the teeth 52 and 70 will register with each other so as to form a very thin air gap 76. The thickness of the air gaps may be only large enough to permit the rotor 42 to turn freely inside of the stator 60. It is also desirable for the faces of the teeth to have as large an area as possible adjacent to each other to thereby permit a maximum amount of flux to flow between the teeth.

Although the sets 56–58 and 66–68 of teeth 52 may be disposed in alignment with each other, the individual teeth 52 and 70 in the sets may not necessarily all be in exact radial alignment with a complementary tooth in another set. More particularly, the number of teeth in each of the inner sets 56 and 58 differs from the number of teeth in the outer sets 66–68 by a predetermined number. Although the magnitude of this difference may be any desired amount, in the present instance, by way of example, each of the inner sets 56 and 58 includes 102 teeth while each outer set 66–68 on the stator 60 includes 100 teeth. It may thus be seen that when the rotor 42 and the stator 60 are positioned axially so that sets 56–58 and 66–68 are aligned, only two teeth in each of the sets can be exactly aligned with two complementary teeth in another set. These aligned or complementary teeth will be on diametrically opposite sides of the rotor 42 and stator 60. The remaining teeth 52 and 70 will become progressively more misaligned until the teeth on the diameter at right angles to the preceding diameter will be completely misaligned. That is, the face on one tooth in each set will be aligned with the face of a tooth in the other set so that their faces will be separated by a very small air gap. At right angles thereto, the face of one tooth will be exactly aligned with the root between a tooth in the opposite set so that the teeth will be separated by a very large air gap.

In order to maintain the teeth 52 and 70 aligned in the desired manner, magnetic flux fields may be provided which produce lines of flux that pass through the aligned sets of teeth. These lines of flux will, in turn, create forces on the teeth that will tend to position the teeth with a minimum air gap therebetween.

To create these flux fields, the high speed rotor 16 may be energized so that the faces 34, 36, 38 and 40 on the ends of the arms 20, 22, 24 and 26 will form pole faces having the lines of flux emanating therefrom at substantially right angles to the surfaces thereof. This rotor may be energized by any suitable means such as electromagnetic. However, in this embodiment, the rotor is permanently magnetized such that the ends of the arm 22 and 26 form North Pole faces while the ends of the arms 20 and 24 form South Pole faces. The arms are preferably separated by an adequate distance to form an air gap of sufficient size to insure a comparatively large reluctance between the pole faces. The rotor 42 and particularly the portion 76 between the sets of teeth are of a material having a high reluctance. The stator 60 may include a base portion 78 that consists of a magnetically permeable material such as soft iron.

It may thus be seen that at least one closed magnetic circuit will be formed that includes the arms 20 and 22, or 24 and 26 of the rotor 16, the sets 56–58 and 66–68 of the teeth 52 and 70 and the base portion 78 of the stator 60. The spacings between the pole faces and the sets of teeth is preferably sufficiently wide compared to the space between the pole faces and stator to prevent any material amount of flux leaking directly between the pole faces. As a consequence, the flux will extend primarily radially between the teeth and will create forces that will endeavor to maintain the teeth in the two sets aligned. However, since each of the sets 56 and 58 of teeth contain different numbers of teeth from the sets 66 and 68 aligned therewith, only a limited number of teeth may be aligned, for example, two in the present instance. Furthermore, since the lines of flux will be concentrated around the pole faces 34, 36, 38 and 40 and since each pole face subtends an arc of only 90°, the teeth in the areas of the pole faces will have forces that tend to align them with each other. In the areas between the faces and where there are no pole faces, there will be very little, if any, flux. The teeth in these areas will thus have no forces to tend to cause them to be aligned. As a consequence, as may be seen in FIG. 2, if there is little or no torque applied to the low speed rotor, the teeth in the center of each magnetic quadrant subtended by a pole face 34 to 40 will be substantially aligned with a tooth in the opposite set. The remaining teeth in the quadrant will be progressively more misaligned depending upon the amount of their displacement from the aligned teeth. In the area of no flux, they will be completely misaligned.

In the event a torque is present on the low speed rotor, the sets 56 and 58 of teeth 52 on the low speed rotor 16 will shift relative to the sets 66 and 68 of teeth on the stator 60. This force will tend to distort the flux field and displace the pair of aligned teeth from the center of the pole faces. As this distortion and the displacement increase, the amount of torque applied to the rotor 42 will increase. When the pairs of aligned teeth are beyond the trailing edges of the pole faces 34 to 40, there will be no flux between the aligned teeth. The torque transfer will then decrease until a new pair of teeth have become aligned.

In order to employ the present gear means, the input and output shafts are connected to the power source and the load. The high speed rotor 16 may then rotate inside of the rotor 42 and the stator 60. When this occurs, the magnetic fields from the pole faces 34 to 40 will travel radially through the various sets of the teeth and maintain pairs of teeth 52 and 70 aligned with each other. As the magnetic field rotates with the rotor 16, the particular pair of teeth that are aligned will continue to remain in the same portion of the flux field and, accordingly, will rotate therewith. Thus, as the field rotates, the teeth 52 in the sets 56 and 58 will become progressively aligned with the teeth 70 in the sets 66 and 68. When the magnetic field has rotated through an arc subtended by say 102 of the teeth 52, the rotor 42 will have revolved enough to cause 102 of the teeth 70 thereon to have been aligned. Since the stator 60 has only 100 teeth, the rotor 42 will have rotated by an amount of two teeth 70.

More particularly, it is believed apparent that if there are identical numbers of teeth in each set 56–58 and 66–68, all of the teeth 52 and 70 will be aligned at all times and the rotating field will not cause any movement of the low speed rotor 42. However, where there are different numbers of teeth with only a pair of teeth in each set being aligned, as the magnetic fields rotate, the alignment of the teeth will also rotate at the same speed. As a consequence, the low speed rotor will rotate at a much lower rate of speed. In fact, its speed will be reduced in the ratio of the difference between the number of teeth in the two sets and the number of teeth in the smallest set. By way of example, if the outer sets 66–68 of teeth 70 have 100 teeth and the inner sets 56–58 have 102 teeth, when the magnetic field makes one complete revolution, the 102 teeth in the low speed rotor 42 will have progressively lined up with 102 teeth on the high speed rotor. Since this represents two more teeth than is in the complete outer set, the low speed rotor will have advanced by an arc equal to that subtended by two teeth or $\frac{1}{50}$ of a revolution. Thus, it will take 50 revolutions of the high speed rotor to cause the low speed rotor to complete one revolution. By decreasing the difference between the number of teeth in the sets, the amount of speed reduction can be increased. For example, if one set has 500 teeth and the other set has 502 teeth, a speed reduction of 250 to 1 will be produced.

It may be seen that the foregoing speed changing effect is produced even though there is no physical or direct mechanical contact between any of the teeth 52 or 70. Since there is no contact, it will not be necessary to service the teeth by lubricating, etc., and there will be no wearing of the various teeth that might cause deterioration. Furthermore, because of the lack of physical contact there will not be any objectionable noises or vibrations produced as has occurred heretofore.

It should also be noted that eliminating the meshing of the gear faces has also eliminated the necessity for the teeth or the faces thereof to be accurately formed as by machining. In fact, it has been found that the teeth can be formed with sufficient accuracy by merely casting them.

As stated heretofore, in the event that there is little or no torque present on the shaft 14, there will be little or no distortion of the magnetic field. As a consequence, the pair of teeth that are precisely aligned with each other will be disposed in radial alignment with the center of the pole faces 34 to 40 substantially as shown in FIG. 2. The displacement or misalignment of the remaining teeth in the quadrant will be symmetrically disposed about the center of the pole faces and the centers of the flux fields. In the event there is a torque on the shafts 14 such as would occur when a load is being driven, the pair of aligned teeth will be displaced from the center of the pole faces 34 to 40 and the flux fields will be distorted. As the amount of the torque transferred between the two rotors 16 and 42 increases, the amount of displacement between the center line of the pole faces 34 to 40 and the aligned teeth 52 and 70 will increase. When the maximum torque of the gear means are reached, the pair of teeth that are aligned will be disposed substantially as shown in FIG. 3. In this condition, the pairs of aligned teeth 52 and 70 will be disposed adjacent the trailing edges of the pole faces with the teeth adjacent the leading edge of the pole faces being completely misaligned. In the event the amount of torque that is required to be transmitted exceeds this amount, the flux field wil lbe further distorted so that the aligned teeth will be displaced beyond the trailing edges of the pole faces. As soon as this condition arises, the amount of attraction between the sets 56–58 and 66–68 of teeth 52 and 70 will decrease until another pair of teeth can become properly aligned. However, if the required torque differential exceeds the capacity of the gear means 10, the pairs of aligned teeth will progressively recede across the pole face and beyond the trailing edges thereof.

It should be noted that in the event of the foregoing overload condition, the low speed rotor 42 or output shaft 14 may run at reduced speed or it may even be stalled and not rotating. Since there is no positive and direct mechanical connection such as intermeshing gear teeth, no damage will be done to the gear means 10. In addition, the amount of torque applied to the load cannot exceed the maximum limit and no damage will be done to the load even if it is stalled. Furthermore, the load that can be imposed on the motor will be limited to an amount that will not overload the motor and damage it. It may thus be seen that in the event of an overload or even stalling of the load, a slipping condition will arise that can be maintained indefinitely without causing any damage to the driving motor, to the gear means, or to the load. As a result, the gear means may be employed as a completely fail-safe torque limiting device even though extremely large torques may be applied to the output shaft.

As an alternative, the gear means 80 of FIGURES 5, 6 and 7 may be employed. This gear means 80 is particularly useful when the load is to be driven by means of an extremely high speed motor or where very large torques are to be produced on the low speed shaft. This embodiment is very similar to the first embodiment in that it also includes a high speed rotor 82, a low speed rotor 84 and a stator 86 that are all disposed substantially concentrically with respect to each other. If this gear means 80 is to be employed in a speed reducing mode, a high speed shaft 88 will form the input shaft and the drive motor may be operatively connected directly thereto. At the same time, a low speed shaft 90 will form the output and, in turn, it may be connected to the load that is to be driven.

The high speed rotor 82 may include a central hub 92 that may be secured directly to the high speed shaft 88 so as to always rotate therewith. A disc or, as shown, a pair of arms 94 may project outwardly from the opposite sides of the hub 92 so as to form an integral part thereof. A vane 96 may be secured to the outer ends of each arm 94 so as to be an integral part thereof. The vanes 96 may be substantially identical to each other and have an arcuate configuration that subtends an arc of approximately 90°. The exterior of each vane 96 may have an outer surface 98 that is preferably substantially cylindrical and concentric about the axis of the shaft. Thus, when the rotor and the vanes thereon rotate, their exteriors will sweep out a cylindrical surface. Each of the vanes may consist of a magnetically permeable material such as a soft iron.

It may be seen from the foregoing description and illustration of the high speed rotor 82 that it may be a very simple and light-weight structure that is strong. Also, the structure may be dynamically balanced with a high degree of precision. As a consequence, this rotor 82 may be easily designed to rotate at extremely high speeds.

The low speed rotor 84 may include a suitable member such as a hub or disc 100 that is secured directly to the low speed shaft 90 so as to always rotate therewith. A drum or cylinder 102 is secured to or is formed integral with the disc 100. This cylinder 102 is disposed around the high speed rotor 84 and substantially concentric with the axes of the two shafts 88 and 90. The interior of the low speed rotor 84 forms a cylindrical surface 104 that is also concentric with the shafts 88 and 90. The inside diameter of the surface 104 is slightly greater than the outside diameter of the volume swept out by the exterior surfaces 98 of the vanes 96. As a consequence, when the high speed rotor 84 revolves and the vanes 96 travel around the interior of the cylindrical surface 104, substantially uniform air gaps 106 will be provided between the exterior of the vanes 96 and the surfaces 98.

The exterior surface of the low speed rotor 84 may have a generally cylindrical configuration that is disposed concentrically about the axes and has at least one set of teeth 108 thereon. In the present embodiment, two sets 110 and 112 are provided that are separated by a high reluctance portion 114. This portion 114 is of sufficient size to magnetically separate the teeth 108. Each of the sets 110 and 112 includes a plurality of teeth 108 that are spaced circumferentially therearound at substantially uniform intervals.

The individual teeth 108 are similar to those in the first embodiment in that they are magnetic members and do not physically engage other members. Accordingly, they may extend from the exterior of the cylindrical section or be contained inside thereof. Also, they may have any desired configuration such as the rectangular form in the first embodiment. However, in this embodiment, for illustrative purposes, they are shown in FIGURES 6 and 7, they are shown as triangular projections outwardly from the exterior of the cylinder. Thus, each of the teeth 108 will have a raised apex 116 with a depressed root 118 adjacent thereto.

The stator 86 comprises an annulus that is disposed concentrically about the two rotors so as to encompass them. This annulus may comprise a single member or include a plurality of similar segments that are joined together so as to form a single rigid structure. The stator 86 which may include an exterior surface 120 of any suitable shape such as the cylinder shown which is suitable for being anchored to a stationary structure so as to always be retained in a fixed position.

The present stator 86 includes a cylindrical base 122 that is substantially concentric with the axes of rotation of the rotors 82 and 84. This base 122 may consist of a low reluctance material such as soft iron for carrying a high density magnetic flux field. A pair of flanges 126 and 128 may be secured to the opposite edges of the base 122 so as to project radially inwardly therefrom. The flanges 126 and 128 terminate in generally cylindrical surfaces 130 and 132 that are substantially coaxial with the rotors 82 and 84. The two flanges 126 and 128 have a thickness substantially equal to the widths of the teeth 108 in the sets 110 and 112. Also, the flanges 126 and 128 are substantially parallel to each other and are separated by a space substantially equal to the width of the portions 114 between the sets of teeth. As a consequence, the surfaces 130 and 132 on the inner ends of the flanges 126 and 128 will register with the sets of teeth 108 and be substantially equidistant from the exterior of the rotor 84.

Sets 134 and 136 of teeth 138 may be formed in the flanges 126 and 128 or on the surfaces 130 and 132 on the ends thereof. The teeth 138 in these sets 134 and 136 are shown as having the same general configuration as the teeth 108 on the low speed rotor 84. More particularly, each tooth 138 has a triangular shape with a raised apex 140 and a depressed root 142. The two sets 110 and 112 of teeth 108 on the rotor 84 are positioned to register with the sets 134 and 136 of teeth 138 on the stator 86. As a consequence, when a pair of teeth 108 and 138 are aligned, a very short air gap 144 will be formed between the apexes 116 and 140 while very long air gaps will be formed between the roots 118 and 142.

As in the first embodiment, the number of teeth 108 in the sets 110 and 112 on this rotor 84 differs from the number of teeth 138 in the sets 134 and 136 on the stator 86. By way of example, the sets 110 and 112 of teeth 108 on the rotor 84 may have 100 teeth each, while the sets 134 and 136 of teeth 138 on the stator 86 may have 102 teeth each. As a consequence, the apexes 116 and 140 of only two teeth in each set will be able to register precisely with the apexes of the teeth in another set. These two pairs of aligned teeth with be 180° apart from each other. The pairs of teeth that are disposed half way between the pairs of aligned teeth will have their apexes 116 and 140 registering with the roots 118 and 142 of the teeth in the opposed sets. The remaining teeth in the sets will be in varying degrees of misalignment depending upon their proximity to the completely misaligned or aligned teeth.

In order to produce a magnetic flux field for reacting with the teeth, the stator 86 and/or the vanes 96 may be permanently magnetized so as to cause the surfaces 98 on the ends of the vanes 96 to act as magnetic pole faces. The resultant lines of flux will extend radially across the air gaps 140 and through the teeth 108 and 138 so as to produce aligning forces thereon. However, in the present instance, the magnetic flux fields are produced by electromagnetic means. Although the electromagnet may be provided on the high speed rotor 82, this is not desirable where the rotor 82 is intended to revolve at extremely high speeds. Accordingly, the energizing coils 146 of the electromagnetic means in this embodiment are mounted on the stator 86. The present energizing coil 146 extends circumferentially around the stator 86 so as to create lines of flux that will flow radially through the flanges 126 and 128 and emerge from the surfaces. As a consequence, one of the surfaces 130 may act as a North Pole face while the other surface 132 will act as a South Pole face. The coil 146 may include a first portion 148 that is disposed in the space between the two flanges 126 and 128 and a portion 150 that is disposed on the outside of the stator 86.

It may be seen that when the coil 146 is not energized, there will be no magnetic flux field generated and there will be no forces that will tend to align the teeth 108 and 138. As a result, the two rotors 82 and 84 may revolve completely independently of each other with little or no effect on each other. However, when the coil 146 is energized, a toroidal flux field will be created around the coil 146. The lines of flux will flow across the base 122 between the pole faces formed by the annular surfaces 130 and 132. In the regions where the vanes 96 are not present, the reluctance of the air gaps between the surfaces 130 and 132 will be very large and the flux density will be very low. In addition, the majority of flux will flow as directly as possible between the surfaces 130 and 132 and very little flux will pass through the teeth 108 or 138. As a consequence, there will be little, if any, force in the regions between the vanes 96 that will tend to bias the teeth 108 and 138 into alignment with each other.

In the regions where the vanes 96 are present, the vanes 96 will parallel the air gap between the surfaces 130 and 132. A magnetic circuit will thus be formed that extends from the North Pole 130 through the sets 110 and 134 of teeth 108 and 138 and the air gaps therebetween, through the vanes, back through the sets 112 and 136 of teeth 108 and 138 and the air gaps therebetween and into the South Pole face 132. Since the vanes 96 consist of a low reluctance material such as soft iron, the reluctance between the pole faces will be drastically reduced. As a consequence, the flux density in the regions of the vanes 96 will be very much higher than in the regions between vanes 96. Moreover, substantially all of the flux in the high density regions will pass through the sets of teeth 108 and 138. This will, in turn, create large biasing forces that will tend to maintain the teeth in the regions of the vanes 96 in alignment. As previously stated, the difference between the numbers of teeth in the two sets will permit only one pair of teeth in each of the sets to be precisely aligned in the regions of each of the vanes 96.

In order to employ this embodiment of the gear means as a speed reducing drive, the shaft 88 for the high speed rotor 84 is connected to the source of power and the shaft 90 for the low speed rotor 82 is connected to the load. It may be observed that the rotor 82 can be made very light and simple so as to be capable of rotating at extremely high speeds, for example, 25,000 to 50,000 or more revolutions per minute. If none of the rotors 82 or 84 or stator 86 are permanently magnetized, and the coil 146 is not energized, the driving motor and/or load can rotate or remain stationary completely independently of each other.

In the event it is desired to couple the load to the motor, the coil 146 is energized. As soon as this occurs, a flux field will be produced wherein the lines of flux will travel between the cylindrical pole faces 130 and 132. In the regions where the vanes 96 are not present, the flux density will be extremely low and the teeth 108 and 138 can be completely misaligned with each other without producing a material force. However, in the regions where the vanes 96 are located, the vanes 96 will form very low reluctance paths paralleling the air gap and the flux density will be very high. This will tend to force pairs of teeth 108 and 138 to align with each other. However, because of the difference in number of teeth, only one pair of the teeth in each pair of sets in each vane region may be aligned. As the high speed rotor 82 rotates, the regions of high and low flux density will travel with the vanes 96 and the flux field will then appear to rotate with the vanes 96. This, in turn, will cause the teeth 108 and 138 to progressively become aligned with each other. Thus, power will be transferred from the high speed rotor 82 to the low speed rotor 84 with the speed being reduced and the torque increased. By regulating the amount of current in the coil 146, the maximum torque that can be transferred will be limited to any desired level. Also, by merely switching the coil 146 on and off, the entire gear means 80 may be clutched and declutched.

As a further alternative, the embodiment of FIGURES 8, 9 and 10 may be employed. This embodiment of the gear means is particularly useful where it is desired to obtain large gear ratios in a very small and compact space with a minimum number of moving parts. More particularly, this gear means 160a and 160b are particularly useful in applications such as an electric clock where size and gear ratios are of primary importance and the power or torque are of minor significance.

In order to make the advantages of this embodiment more apparent, the gear means 160 are shown and described as being included in an electric clock 162. The present clock 162 includes a substantially cylindrical housing 164 having a plane back 166 and a transparent cover 168 so that the minute and hour hands 170 and 172 may be viewed from the front of the clock 162. A conventional electric motor 174 may be secured on the back 166 so as to interconnect with an electric power source.

In order to drivingly interconnect the motor 174 with the hands 170 and 172, a plurality of the gear means 160 may be provided. Each of these gear means 160a and 160b are similar to each other and to the gear means in the preceding embodiments. The gear means 160a includes a high speed rotor 176, a low speed rotor 178, and a stator 180. These are all disposed in a common plane and concentrically about the axis of a shaft 182. In the present instance, this shaft 182 extends the entire length of the clock 162 and consists of a thin wire. One end of the wire may be anchored in the face plate 168 while the other end is supported by a spring 184. The spring 184 is provided to exert a sufficient force on the wire to maintain it taut and straight.

The high speed rotor 176 is mounted upon a tube or sleeve 186 that is disposed concentrically about the wire shaft 182. A plurality of jewels or bearings 188 may be disposed in the sleeve 186 to support it concentrically upon the wire shaft 182. One end of the sleeve 186 has a gear 190 that meshes with a gear 192 on the output shaft of the electric motor 174.

The rotor 176 is secured directly to the tubular shaft 186 so as to rotate therewith. The present rotor 176 includes a pair of arms 192 and 194 which project from the diametrically opposite sides thereof. The outer ends of these arms 192 and 194 form cylindrical faces 196 and 198 which subtend arcs that approximate 90°. This rotor 176 may be formed from a thin sheet by any suitable process such as stamping and may consist of a material having a low magnetic reluctance such as soft iron.

The low speed rotor 178 may comprise an annular ring having a cylindrical inner surface 200 and a cylindrical surface 202. The inside diameter of the surface 200 is only slightly greater than the outside diameter of the faces 196 and 198 on the high speed rotor 176. This will form a small air gap 203 that may be on the order of $\frac{1}{32}$ to $\frac{1}{16}$ of an inch thick. A pair of arms 204 and 206 may be mounted upon a second tubular shaft 208. This shaft 208 includes a plurality of bearings or jewels 210 which rotatably support the shaft 208 concentrically upon the wire shaft 182. This rotor 178 and the arms 204 and 206 may comprise materials having a high magnetic reluctance, for example, brass or aluminum. This rotor 178 may be stamped or otherwise formed from a sheet of material so as to be substantially the same thickness as the rotor 176. A set 212 of teeth 214 may be provided on the rotor 178 by any suitable means. For example, these teeth 214 may be formed by printing, electrodeposition, spraying, etc., a suitable material. Since these teeth are a part of a magnetic material, they may comprise a material such as a nickel alloy that has a relatively high magnetic permeability.

The stator 180 includes an annular ring having a cylindrical outer surface that just fits inside of the housing 164 and a cylindrical inner surface 216. The inner surface 216 is disposed concentrically about the exterior surface 200 of the low speed stator 180. The rotor 178 may be clamped into the housing 164 by one or more annular members 218 so as to position the surface 216 immediately adjacent the surface 200 so as to form an air gap 220. The stator 180 may be formed from a sheet of the same thickness as the rotors 176 and 178 and may consist of a material having a high magnetic reluctance such as aluminum or brass.

A set 222 of teeth 226 may be formed upon this stator by any suitable means such as printing, electro-deposition, etc., and may consist of a material having a low magnetic reluctance such as a nickel alloy.

It may be seen that the gear means includes rotors 176, 178 and a stator 180 that may be formed of very thin stock. Also, the teeth 214 and 226 thereon are very thin films. As a consequence, the gear means may have a very small dimension axially of the clock.

In order to couple the teeth 214 and 226 together, a magnetic field may be created by any suitable means. In this embodiment, a permanent magnet 228 is disposed on the end wall 166 of the housing 164. This magnet 228 will create a magnetic flux field which will extend through the teeth through the entire clock. However, to increase the strength of the flux, the end wall 166 and retainer rings 218 may be made of a magnetic material such as soft iron. This will reduce the reluctance and create more flux lines in the regions of the gear means 160a and 160b.

When the motor 174 drives the high speed rotor 176, it will revolve inside of the low speed rotor 178. The flux will be concentrated in the arms 192 and 194 of the rotor 176. As a consequence, the flux field will have regions of high density adjacent the faces 196 and 198 and regions of low density in between. Moreover, these regions will appear to rotate at the same speed as the rotor 178. It may thus be seen that although the amount of torque which may be transmitted may be relatively small, a reaction will occur that will progressively align the teeth on the rotor 178 and the stator 180 and rotate the rotor 178 at a slow speed. Preferably, the speed reduction of the gears 190 and 192 and the gear means 160a will cause the shaft 208 to rotate at one revolution per hour.

The second gear means 160b may be similar to the first gear means 160a in that it includes a high speed rotor 230, a low speed rotor 232 and a stator 234 which are arranged substantially identical to their counterparts in the first gear means. The high speed rotor 230 is mounted on the shaft 208 and will therefore revolve at one revolution per hour. As a consequence, the minute hand 170 may be mounted thereon. The low speed rotor 232 may be mounted on a shaft 236 by a pair of arms 238. The teeth may be formed as thin films of magnetically permeable material on the stator 234 and the rotor 232. These are preferably arranged to provide a 12 to 1 speed reduction between the high speed and low speed rotors. As a consequence, the low speed rotor will rotate once every twelve hours and the hour hand may be mounted thereon.

It will thus be seen that the gear means may be made extremely simple and extremely thin. As a consequence, they are particularly well suited for use in applications such as a very small clock.

Figure 11:
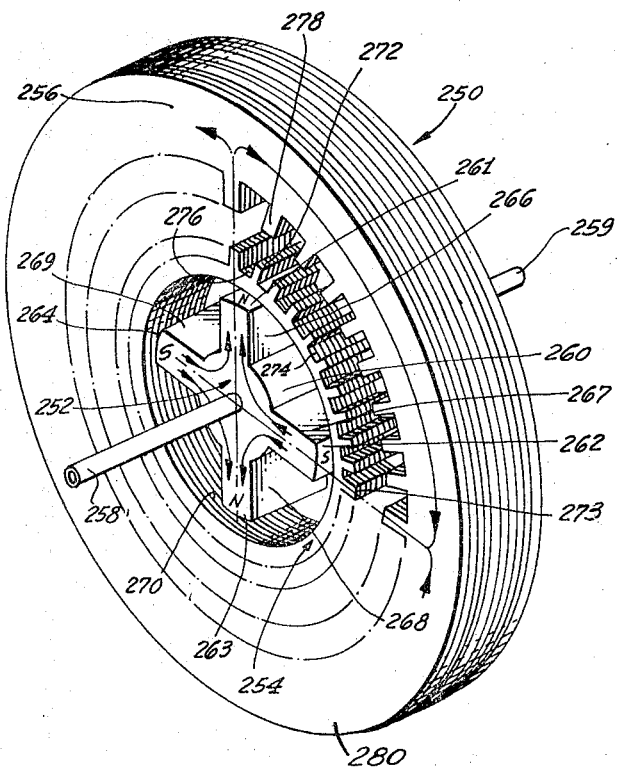
FIGURE 11 is a perspective view of gear means employing a different embodiment of the present invention.

As an alternative, the gear means 250 of FIGURE 11 may be employed. As will become apparent, this embodiment is particularly useful where it is desired to provide a high gear ratio in a small space. The gear means 250 is very similar to the preceding embodiments in that it also includes a high speed rotor 252, a low speed rotor 254 and a stator 256 that are all disposed substantially concentric with respect to each other. The high speed rotor 252 is secured to a shaft 258 for transmitting torque therebetween. If this gear means 250 is employed in a speed reducing mode, this shaft 258 may be connected directly to the output of a drive motor (not shown). The low speed rotor 254 is secured to a second shaft 259 which, in the speed reducing mode, will be an output shaft that may be interconnected with the load to be driven.

The high speed rotor includes a central hub 260 that is secured directly to the high speed shaft 258 so as to always rotate therewith. In addition, a plurality of magnetic pole faces 261, 262, 263 and 264 are provided on this hub for radiating magnetic lines of flux from the rotor. The pole faces 261 to 264, inclusive, may be energized by any suitable means such as by electromagnets, etc. However, in the present instance a plurality of permanently magnetized faces are provided. These pole faces 261 to 264, inclusive, may be formed on the exterior of the hub 260 or may be formed by a plurality of arms 266, 267, 268 and 269 which project radially outwardly from the hub 260. The number of pole faces, four in the present embodiment, will be determined in part by the amount of speed reduction desired. In the present instance, there are two pairs of pole faces with the pole faces 261 and 263 on the diametrically opposite sides having a North polarity and the pole faces 262 and 264 having a South polarity. The lines of flux within the rotor 252 extend through the central hub 260 and out the arms 266 to 269, inclusive. The lines of flux outside of the rotor 252 will radiate from the faces 261 to 264, inclusive, and on the ends of the arms 266 to 269, inclusive, and extend in loops between the faces of opposite polarities.

The low speed rotor 254 which is rotatable relative to the high speed rotor 252 includes a substantially cylindrical interior surface 270 which is disposed concentric with the axis of the rotor 252. This surface 270 will thus be substantially uniformly spaced from the pole faces 261 to 264, inclusive. As the pole faces 261 to 264, inclusive, rotate inside of the low speed rotor 254 and sweep across the inner surface 270, a substantially uniform air gap will be maintained between the pole faces and the rotor 254.

The low speed rotor 254 may also include a set 272 of teeth 273. These teeth 273 are of the magnetic variety and accordingly may be constructed in any suitable manner. However, in the present embodiment they include projections which extend radially outwardly from the body 274 of the rotor 254 and are separated by air spaces 276.

The rotor 254 may be constructed in any desired manner such as machining from a solid block. However, in the present instance it is formed by a series of substantially identical laminations secured together to provide a single integral structure. It may be noted that although each of the laminations may be of a standard size and shape, by securing any desired number of laminations together the rotor 254 may be made any desired axial dimension. The rotor 254, including the teeth 273, may contain a magnetically permeable material such as a soft iron. The rotor 254 will thus have a low reluctance in radial directions in the regions of the teeth 273 whereby the lines of flux from the pole faces 261 to 264, inclusive, may extend radially outwardly through the teeth. Preferably, the thickness of the body 274 between the teeth 273 is sufficiently small and the spaces 276 between the teeth 272 sufficiently large to provide a high reluctance to the flow of flux circumferentially around the rotor 252. This will permit only a negligible quantity of flux to flow circumferentially around the rotor 252.

The stator 256 is preferably disposed outside of the two rotors 252 and 254 and is substantially concentric therewith. This stator 256 may be formed in any desired manner. However, in the present instance it is formed from a series of soft iron laminations similar to those employed in the low speed rotor 252. By employing the laminations, the length of the stator 256 can be readily varied to any extent so as to be the same length as the rotor 254.

The stator 256 includes a set 278 of magnetic teeth that are effective to cooperate with the first set 272. Although these teeth may be of any desired form, in the present embodiment they are physical projections that extend radially inwardly so that the inner ends of the teeth 278 will be spaced from the outer ends of the teeth in the first set 272. Thus, when a tooth in the first set 272 is exactly radially aligned with a tooth in the second set 278, small air gaps will be provided between the ends of the teeth. As a consequence, the flux from a pole face may flow radially from the pole face through the teeth on the low speed rotor 254 and through the teeth on the stator 256.

The main body of the stator forms a rim 280 which encircles the teeth. This rim 280 has a sufficient radial thickness to provide a low reluctance path whereby the flux that has passed through a pair of aligned teeth may flow circumferentially around the stator 256 until it can emerge from the rim 280 and pass through a pair of aligned teeth into an adjacent pole face.

When the high speed rotor 252 is connected to a drive motor and rotated at a high rate of speed, the pole faces 261 to 264, inclusive, will sweep around the inside surface 270 of the rotor 254. This, in turn, will cause the lines of flux to flow radially outwardly through the rotor 254 and to rotate at the same rate of speed as the rotor 252. The density of the flux lines will be maximum in the regions of the pole faces 261 to 264, inclusive, and where a pair of teeth are in direct radial alignment. The flux lines will tend to maintain the teeth in alignment with each other. As a result, when the magnetic field rotates, the teeth in the two sets 272 and 278 will successively line up with each other. If the two sets 277 and 278 have different numbers of teeth, for example, 60 and 64 teeth, each time the rotor 252 makes one revolution the rotor 254 will retrogress 4 teeth relative to the stator 256. As a consequence, when the rotor 252 completes 15 revolutions, the rotor 254 will complete one revolution. The lines of flux produced by the permanently magnetized arms 266 to 269, inclusive, will produce a predetermined maximum torque between the rotors 252 and 254. In the event the output shaft stalls and the rotor 254 cannot rotate, the torque load on the motor will be too low to stall or overload the drive motor even if it runs indefinitely.

It may be seen that by providing standard laminations the rotor 254 and stator 256 may be fabricated to any desired axial dimension so that the gear train 250 may have any desired capacity. In addition, since the opposed pole faces in this embodiment are now spaced circumferentially from each other, the flux lines will now flow in circumferential loops. As a consequence, it is not necessary to provide any axial spacing between the two pole faces in order to concentrate the flux in the teeth. This, in turn, will permit the axial dimensions of this gear train to be made substantially smaller than the axial dimensions of the preceding gear trains.

While only a limited number of embodiments of the present invention are disclosed and described herein, it will be readily apparent to persons skilled in the art that numerous changes and modifications may be made thereto without departing from the spirit of the invention. Accordingly, the foregoing disclosure including the drawings and the description thereof are for illustrative purposes only and do not limit the scope of the invention which is defined only by the claims that follow.

What is claimed is:

1. Gear means for operatively connecting a power source with a load that is to be driven by said source, said gear means including:
    a first member having a first set of spaced teeth with magnetizable properties,
    a second member disposed adjacent said first member and having a second set of teeth spaced adjacent to the teeth in said first set and provided with magnetizable properties,
    one of said sets having more teeth than the other of said sets and being positioned with only a particular number of teeth in one set being aligned with a corresponding number of teeth in the other set at any particular instant,
    magnetic means for creating a variable magnetic flux field having lines of flux that extend through portions of each set of teeth for progressively aligning the succeeding teeth in the two sets with each other,
    means operatively coupled to a particular one of the first and second members for driving the particular member relative to the other member, and
    means operatively coupled to the magnetic means for varying the magnetic flux field created by the magnetic means to control the torque which can be applied to the particular one of the first and second members to drive the particular member relative to the other member.

2. Gear means for operatively connecting a power source with a load that is to be driven by said source, said gear means including:
    a first annular member having a first set of circumferentially spaced teeth and having magnetizable properties,
    a second annular member concentrically disposed with respect to said first member and having a second set of circumferentially spaced teeth disposed adjacent the teeth in said first set and having magnetizable properties,
    one of said sets of teeth having more teeth than the other of said sets and being positioned so that only a particular number of teeth in one set can be aligned with a corresponding number of teeth in the other of said sets at any particular instant,
    magnetic means including a winding for producing a variable magnetic flux field extending through the first and second sets of teeth and rotary relative to at least one of said members for progressively aligning the successive teeth in one set with the successive teeth in the other of said sets during the rotation of the magnetic field, and
    means operatively coupled to the winding for varying the current flow through the winding to provide a clutch arrangement for controlling the progressive alignment of the successive teeth in the one set with the successive teeth in the other set.

3. Gear means for operatively connecting a power source with a load that is to be driven by said source, said gear means including:
    a first annular member having a particular axis,
    a first set of teeth disposed on said member and uniformly spaced circumferentially on said member and having magnetizable properties,
    a second annular member having the particular axis and coaxial with said first member,
    a second set of teeth disposed on said second member and uniformly spaced circumferentially on the second member and having magnetizable properties, said first and second sets of teeth being positioned in complementary relationship,
    one of said sets having more teeth than the other of said sets to provide an alignment between individual ones of the teeth in one of the sets and corresponding teeth in the other of said sets at successive instants,
    means including a winding for producing a variable magnetic flux field having lines of flux extending through said teeth in said first and second sets for biasing one tooth in each portion with a complementary tooth in the other portion,
    means for causing said flux field to rotate relative to at least one of said members to thereby progressively align the successive teeth in the two sets with one another, and
    means operatively coupled to the winding for varying the flow of current through the winding to provide a clutch arrangement for controlling the progressive alignment of the successive teeth in the two sets with one another.

4. Gear means for operatively connecting a power source with a load that is to be driven by said source so as to transmit torque to said load, said gear means including:
    a first annular member having a particular axis,
    a first set of teeth disposed circumferentially on said member at substantially uniform increments of distance and having magnetizable properties,
    a second annular member having the particular axis, a second set of teeth disposed circumferentially on said second member at substantially uniform increments of distance and having magnetizable properties, said first and second sets of teeth being positioned in complementary relationship to form a series of air gaps between the sets of teeth, one of said sets having more teeth than the other of said sets to provide an alignment between individual teeth in one of said sets with corresponding teeth in the other of said sets at successive instants of time, means including a winding for producing a variable magnetic flux field having lines of flux extending through said first and second sets of teeth and across said air gaps, said flux density being effective to produce a force that will align individual teeth in the one set with complementary teeth in the other set, means for causing said flux field to rotate relative to at least one of said annular members to obtain a progression of the aligned teeth in the first and second sets circumferentially around said annular members, and means operatively coupled to the winding for producing a variable flow of current through the winding to provide a clutch arrangement for controlling the progression of the aligned teeth in the first and second sets circumferentially around the annular members.

5. A magnetic gear train for operatively interconnecting a rotary power source means with rotary load means that are to be driven by said power source means, said gear train including:

a first annular member disposed for rotation on a particular axis, a coupling on said first member for connecting said first member to a particular one of said rotary power source means and said rotary means for rotation with such particular means, a second annular member disposed on the particular axis, said second member being disposed in spaced relation to said first member to provide relative rotation between said first member and said second member, means for restraining the second annular member against rotation, a first set of teeth circumferentially disposed on one of said first and second members at substantially uniformly spaced increments of distance and having magnetizable properties, a second set of teeth circumferentially disposed on the other one of said first and second members at substantially uniformly spaced increments of distance and having magnetizable properties, said first and second sets of teeth being positioned in complementary relationship to form a series of air gaps between the various teeth in said first and second sets, said first set having a different number of teeth than said second set to provide an alignment between individual teeth in one of the sets with corresponding teeth in the other set, means for creating a magnetic flux field having lines of flux that extend through said teeth in the first and second sets and across said air gaps between said teeth, means for causing said flux field to rotate relative to at least one of said first and second members to obtain a rotation of the teeth being aligned, a coupling on said magnetic means for connecting that member with the other one of said rotary power source means and said rotary load, and means operatively coupled to the means for creating the magnetic flux field to obtain the production of the magnetic flux field with a sufficient intensity only at controlled periods of time to provide a clutch arrangement only at the controlled periods of time for obtaining a rotation of the teeth being aligned.

6. A magnetic gear train for operatively interconnecting a power source with a load to be driven by said source, said gear train including:

a first annular member having a particular axis and mounted for rotation on said particular axis, first and second sets of teeth circumferentially disposed on said member at uniformly spaced increments of distance and having magnetizable properties, the teeth in the first set being spaced axially from the teeth in the second set, a second annular member having the particular axis, said second annular member being separated from said first annular member to provide a relative rotation between the members, third and fourth sets of teeth circumferentially disposed on said second member at uniformly spaced increments of distance and having magnetizable properties, the teeth in the third set being spaced axially from the teeth in the second set, the teeth in said first and third sets and in said second and fourth sets being respectively juxtaposed to one another but separated from one another by a series of air gaps to provide for relative rotation between said teeth, the number of teeth in the first and second sets being greater than the number of teeth in the third and fourth sets to obtain an alignment between individual teeth in the first and second sets with a corresponding number of teeth in the third and fourth sets at successive instants of time, a rotor disposed in coaxial relationship with said first and second annular members, a pair of magnetic pole faces respectively disposed on said rotor adjacent said first and third sets of teeth and said second and fourth sets of teeth to form at least one magnetic circuit that includes portions of the teeth in each of said sets and the air gaps therebetween, and means for creating at least one magnetic flux field in said rotor with lines of flux that extend from said pole faces and through said teeth in the first, second, third and fourth sets to thereby create forces for biasing individual teeth in said first and second sets and said third and fourth sets into alignment with one another, said rotor being effective to cause said magnetic fields to rotate and the pairs of aligned teeth to progress around said sets so that said rotor will rotate relative to the first annular member as a function of the difference between the number of teeth in said first and second sets relative to said third and fourth sets.

7. The magnetic gear train set forth in claim 6 wherein means are operatively coupled to the magnetic pole faces for obtaining the passage of flux from the pole faces through the first, second, third and fourth sets of teeth and the air gaps between the teeth only at controlled periods of time to provide a clutching arrangement for controlling the progressive alignment of the individual teeth in the first and second sets with the corresponding teeth in the third and fourth sets.

8. A magnetic gear train for operatively interconnecting rotary power means with rotary load means to be rotatably driven by said power means, said gear train including:

a first rotor comprising a first hollow annular member having a particular axis and mounted for rotation on said axis, a coupling for interconnecting said rotor with a particular one of said rotary power means and said rotary load means to rotate therewith, a first set of teeth circumferentially disposed on said rotor at substantially uniformly spaced increments of distance and having magnetizable properties, a stator comprising a second hollow annular member having the particular axis, an anchor for maintaining said stator in a stationary fixed position, a second set of teeth circumferentially disposed on said stator at substantially uniformly spaced increments of distance and having magnetizable properties, the teeth in said first and second sets being juxtaposed to each other but separated from each other by a series of air gaps to thereby permit relative movement between said teeth and between said rotor and said stator, the number of teeth in one of said sets being greater than the number of teeth in the other of said sets to obtain alignment between individual teeth in one set and teeth in the other set at successive instants of time, a second rotor having the particular axis and disposed within the first and second hollow annular members, a coupling for interconnecting said second rotor with the other of said rotary power means and said rotary load means for rotating therewith, a pair of magnetic pole faces on said second rotor disposed adjacent said first rotor and stator to form at least one magnetic circuit that includes the teeth in each of said first and second sets and the air gaps between the teeth, and means operatively coupled to the pair of magnetic pole faces for producing magnetic flux in the pole faces and in the teeth in the first and second sets only during controlled periods of time with a sufficient intensity to provide a clutching arrangement during such controlled periods of time for obtaining a progressive alignment of individual teeth in the first member with corresponding teeth in the second member during such controlled periods.

9. The gear train set forth in claim 8 wherein the first annular member is provided with a third set of teeth corresponding to the first set of teeth and disposed in axially spaced relationship to the first set of teeth and wherein the second annular member is provided with a fourth set of teeth corresponding to the second set of teeth and disposed in axially spaced relationship to the second set of teeth and in contiguous relationship to the third set of teeth and wherein the second rotor is provided with pole faces in contiguous relationship to the first and third sets of teeth and the second and fourth sets of teeth.

References Cited by the Examiner
UNITED STATES PATENTS 1,894,979   1/1933   Chubb _____ 74—640 X DAVID J. WILLIAMOWSKY, *Primary Examiner.*

DON A. WAITE, T. C. PERRY, *Examiners.*

M. H. FREEMAN, *Assistant Examiner.*